(12) United States Patent
Kubota

(10) Patent No.: US 7,735,896 B2
(45) Date of Patent: Jun. 15, 2010

(54) ALL TERRAIN VEHICLE WITH FOLDING REAR SEAT AND ENCLOSED CONTAINER COMPARTMENT

(75) Inventor: Satoshi Kubota, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 220 days.

(21) Appl. No.: 12/017,783

(22) Filed: Jan. 22, 2008

(65) Prior Publication Data
US 2009/0184536 A1 Jul. 23, 2009

(51) Int. Cl.
*B60N 2/32* (2006.01)
*B60N 2/36* (2006.01)

(52) U.S. Cl. .................. 296/69; 296/65.16; 296/63; 296/37.15; 296/37.14; 297/188.1

(58) Field of Classification Search .............. 296/24.43, 296/37.1, 37.5, 37.6, 37.8, 37.14, 37.16, 296/63, 64, 65.01, 66, 67, 65.05, 65.16, 69; 224/401, 274, 539, 542, 275; 297/14, 15, 297/378.1, 118, 129, 188.01, 188.08, 188.09, 297/188.1
See application file for complete search history.

(56) References Cited

U.S. PATENT DOCUMENTS

| 6,386,612 | B2 * | 5/2002 | Hofmann et al. | 296/37.15 |
| 6,582,004 | B1 | 6/2003 | Hamm | |
| 6,905,159 | B1 * | 6/2005 | Saito et al. | 296/65.01 |
| 6,994,388 | B2 | 2/2006 | Saito | |
| 7,121,606 | B2 * | 10/2006 | Khan et al. | 296/37.15 |
| 7,287,779 | B2 * | 10/2007 | Miller | 280/781 |
| 2008/0084082 | A1 * | 4/2008 | Nakamura et al. | 296/37.15 |
| 2009/0079254 | A1 * | 3/2009 | Jacobs | 298/18 |
| 2009/0115229 | A1 * | 5/2009 | Messner et al. | 297/188.1 |

* cited by examiner

*Primary Examiner*—Patricia L Engle
(74) *Attorney, Agent, or Firm*—Keating & Bennett, LLP

(57) ABSTRACT

An all-terrain vehicle has a cargo deck provided above rear wheels and a folding rear seat disposed on a front portion of the cargo deck. A seating surface covers an opening portion of an article storage area when the seating surface is set to allow an occupant to be seated on the seating surface. A backrest is rotated forward about rear rotation axes to cover the opening portion when the seating surface is rotated forward about the front rotation axes, thereby covering the opening portion of the article storage area.

10 Claims, 5 Drawing Sheets

ALL TERRAIN VEHICLE WITH FOLDING REAR SEAT AND ENCLOSED CONTAINER COMPARTMENT

BACKGROUND OF THE INVENTION

1. Field of the Invention

The present invention relates to an all-terrain vehicle having a cargo deck provided above rear wheels and a folding rear seat disposed on a front portion of the cargo deck. An article storage area for storing a container is provided.

2. Description of the Related Art

Conventionally, all-terrain vehicles (ATVs) have been commercially available, which can travel on various terrains, such as mud, sand beach, snowy roads, and mountain roads. A well-known type of these ATVs has four wheels and a cargo deck at the rear part thereof (for example, see U.S. Pat. No. 6,994,388 to Saito et al.). Such an ATV has a rear seat that is foldable forward. A space of the cargo deck is expandable by folding the rear seat forward.

Typically, the aforementioned type of ATV has an open body with no roof or doors. In case that a baggage is loaded on the cargo deck, such a typical ATV suffers from the following problem.

That is, an open type ATV has the problem that water splashes or dust may directly hit baggage that is merely loaded on the cargo deck. In addition, the ATV has another problem that baggage merely loaded on the cargo deck tends to be stolen more frequently.

In order to solve these problems, a box-shaped article storage area may be provided on the cargo deck or a cover may be used for covering the cargo deck. However, providing the article storage area on the cargo deck or using a cover for the cargo deck results in an increase in the ATV's weight. Even though the ATV employs a folding rear seat to obtain a structure that can expand a space of the cargo deck, when baggage that a user does not care if water directly splashes or dust hits is to be loaded on the cargo deck, the article storage area provided thereon interferes with the baggage.

SUMMARY OF THE INVENTION

The present invention is derived from the foregoing circumstances, and an object of the invention is to provide an all-terrain vehicle having a rear seat foldable to expand a space of a cargo deck, the all-terrain vehicle further including an article storage area which minimizes weight increase, sacrifices no space of the cargo deck, and protects baggage from direct water splashes or dust.

To solve the above problems, an all-terrain vehicle (all-terrain vehicle 10) according to the present invention includes rear wheels (left rear wheel 90L and right rear wheel 90R), a cargo deck (cargo deck 80) provided above the rear wheels, and a folding rear seat (rear seat 100) disposed on a front portion (front portion 80a) of the cargo deck, in which an article storage area 139 is disposed below the rear seat for receiving a storage container 140 which has an opening portion (opening portion 140a) that opens upward with respect to the all-terrain vehicle. The rear seat includes a seating surface (seating surface 110), and a backrest (backrest 120) disposed in a vehicle lateral direction at the rear of a front end portion (front end portion 110a) of the seating surface. The front end portion of the seating surface is supported to be rotatable forward with respect to the all-terrain vehicle about front rotation axes (rotation axes 111L and 111R) arranged in the vehicle lateral direction. A lower end portion (lower end portion 120a) of the backrest is supported to be rotatable forward with respect to the all-terrain vehicle about rear rotation axes (rear rotation axes 121L and 121R) arranged in the vehicle lateral direction; the seating surface covers the opening portion when the seating surface is rotated to allow an occupant to be seated on the seating surface; and the backrest is rotated forward about the rear rotation axes to cover the opening portion when the seating surface is rotated forward about the front rotation axes.

In such an all-terrain vehicle, the opening portion of the article storage area is covered. Preferably this area is covered by the seating surface of the folding rear seat or the backrest. This protects baggage stored in the article storage from direct water splashes or dust. This also provides more effective theft prevention of a baggage, compared to the case where the baggage is merely loaded on the cargo deck.

Further, in such an all-terrain vehicle, the recess of the cargo bed floor is covered by the seating surface of the folding rear seat or the backrest. This minimizes weight increase of the all-terrain vehicle, compared to the case where the article storage area is provided on the cargo deck or a cover is used for covering the cargo deck.

A second aspect of the present invention is that the rear wheels are a left rear wheel (left rear wheel 90L) and a right rear wheel (right rear wheel 90R) disposed in the vehicle lateral direction, and the article storage area is disposed between the left rear wheel and the right rear wheel.

A third aspect of the present invention is that the article storage area is sufficient for storing a container with an opening portion, a support portion or frame (box support portion 81a) is provided below the seating surface, the support portion engages the container to support the container, and the container may be removed from the all-terrain vehicle by means of solely drawing the container out.

A fourth aspect of the present invention is that a recess (recess S1) is created within cargo bed floor 81 for accommodating the backrest when it is rotated forward about the rear rotation axes.

A fifth aspect of the present invention is that the backrest has a flat-shaped back surface portion (back surface portion 123).

A sixth aspect of the present invention is that a component to be serviced (e.g. rear differential case 45) is accessible via the article storage area.

DESCRIPTION OF THE PREFERRED EMBODIMENTS

Figure 1:
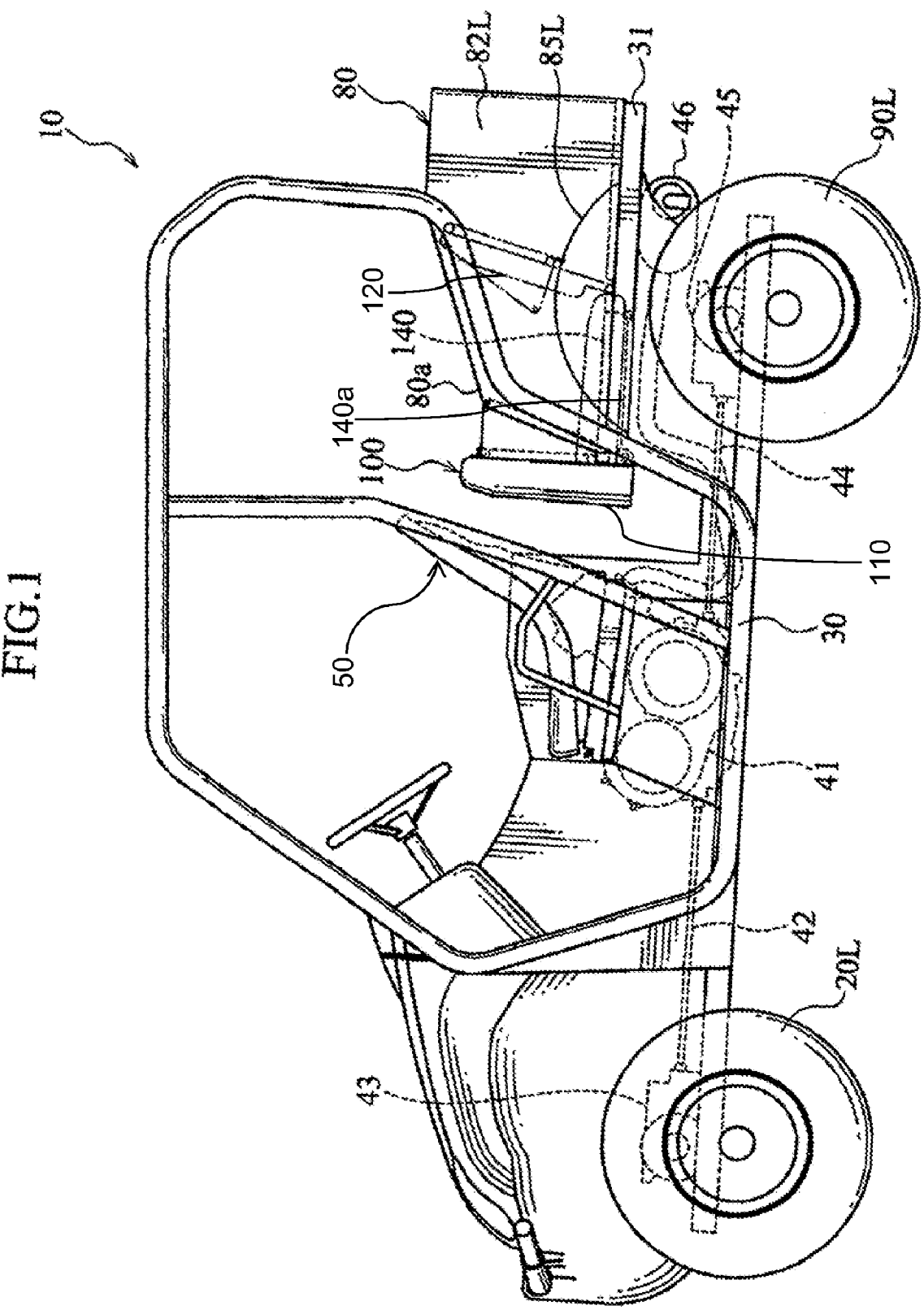
FIG. 1 is a left side elevation view generally illustrating an all-terrain vehicle 10 according to an embodiment of the present invention.

The embodiment of the present invention will now be described. More specifically, descriptions will be made of (1)

an overall schematic construction of an all-terrain vehicle, (2) a rear seat and article storage structure, (3) action and effect, and (4) other embodiment.

In the following descriptions in regard to the drawings, identical or similar parts are denoted by the identical or similar reference numerals. It should also be noted that each drawing is shown schematically, and may represent different dimensional ratios and the like from those of the actual parts.

Hence, specific dimensions and the like should be determined in consideration of the following descriptions. Further, it is a matter of course that different drawings include elements which have different dimensional relations and ratios.

(1) Overall Schematic Construction of All-Terrain Vehicle

FIG. 1 is a left side elevation view generally illustrating an all-terrain vehicle 10 according to the embodiment of the present invention. The all-terrain vehicle 10 is a four-wheeled motor vehicle designed to travel across various terrains, such as mud, sand beach, snowy roads, paved roads, and mountain roads.

As shown in FIG. 1, a left front wheel 20L and a left rear wheel 90L are provided on the left side of the all-terrain vehicle 10. In turn, a right front wheel (not shown), which is identical to the left front wheel 20L, is provided on the right side of the all-terrain vehicle 10. Also, a right rear wheel 90R (not shown in FIG. 1, see FIG. 2), which is identical to the left rear wheel 90L, is provided on the right side of the all-terrain vehicle 10. In other words, two front wheels and two rear wheels are disposed respectively in the vehicle lateral direction.

The all-terrain vehicle 10 has a body frame 30 that forms a structure of the all-terrain vehicle 10. An engine 41 is mounted on the body frame 30 to drive the left front wheel 20L, the right front wheel (not shown), the left rear wheel 90L, and the right rear wheel 90R (see FIG. 2).

In the left side view of the all-terrain vehicle 10, the engine 41 is disposed in approximately the middle of the vehicle between the left front wheel 20L and the left rear wheel 90L. Power outputted by the engine 41 is transmitted to the left front wheel 20L and the right front wheel (not shown) via a front drive shaft 42 and a front differential case 43. In turn, power outputted by the engine 41 is transmitted to the left rear wheel 90L and the right rear wheel 90R via a rear drive shaft 44 and a rear differential case 45. The engine 41 connects to a silencer 46.

The all-terrain vehicle 10 has two front seats 50. The front seats 50 are disposed on the left and the right sides of the engine 41 disposed at approximately the middle in the vehicle lateral direction.

The all-terrain vehicle 10 has a rear seat 100. The rear seat 100 is disposed at the rear of the front seats 50.

The rear seat 100 has a folding structure. The rear seat 100 is also disposed on a front portion 80a of a cargo deck 80. A space of the cargo deck 80 can be expanded by folding the rear seat 100. FIG. 1 shows a state that the rear seat 100 is folded.

Two adult occupants can be seated on the rear seat 100. That is, the all-terrain vehicle 10 can accommodate total four adult occupants.

The cargo deck 80 is provided above the left rear wheel 90L and right rear wheel 90R. The cargo deck 80 has a pair of side plates 82L and 82R (not shown in FIG. 1, see FIG. 2). The cargo deck 80 also has tire houses 85L and 85R (not shown in FIG. 1, see FIG. 2) associated with the left rear wheel 90L and 90R. The tire houses 85L and 85R are raised upward from a cargo bed floor 81 (not shown in FIG. 1, see FIG. 2) of the cargo deck 80.

The cargo deck 80 is supported by a sub frame 31 extending from the body frame 30 toward the rear with respect to the all-terrain vehicle 10.

A storage container 140 for storing an article is provided below the rear seat 100. In this embodiment, the storage container 140 is located within an article storage area 139. In order to store an article in the storage container 140, the rear seat 100, or more specifically, the seating surface 110 (not shown in FIG. 1, see FIG. 2) is rotated forward.

(2) Rear Seat and Article Storage Area Structure

Now, a structure of the rear seat 100 and the storage container 140 is described. More specifically, descriptions are made of a folding mechanism of the rear seat 100 and a structure of the storage container 140.

(2.1) Folding Mechanism of Rear Seat 100

Figure 2:
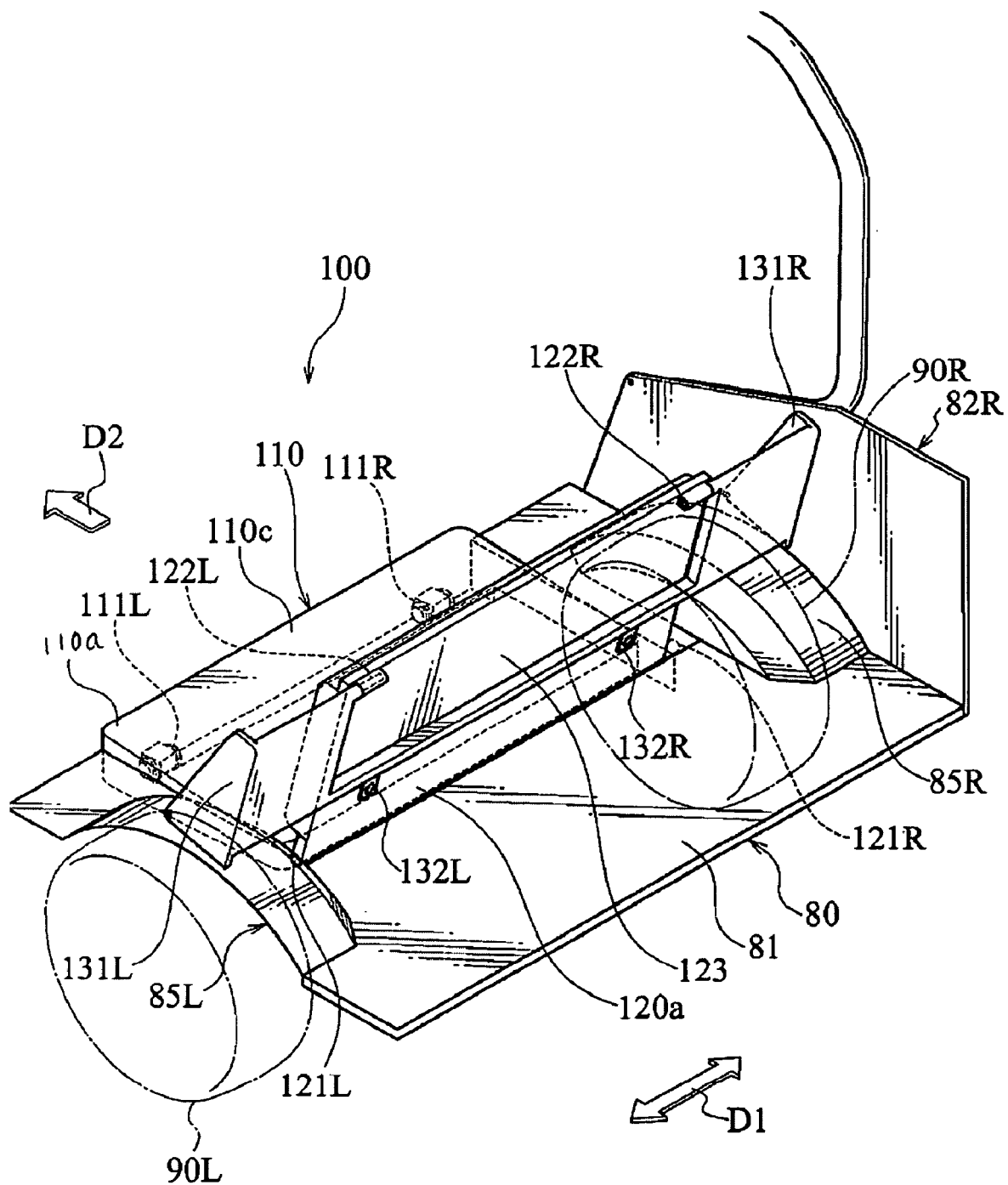
FIG. 2 is a perspective view of a part of the all-terrain vehicle 10 according to the embodiment of the present invention, when viewed obliquely from the left rear side.

FIG. 2 is a perspective view of a part of the all-terrain vehicle 10 with the rear seat 100 in use. More specifically, FIG. 2 is a perspective view of a part of the all-terrain vehicle 10 when viewed obliquely from the left rear side.

Figure 3:
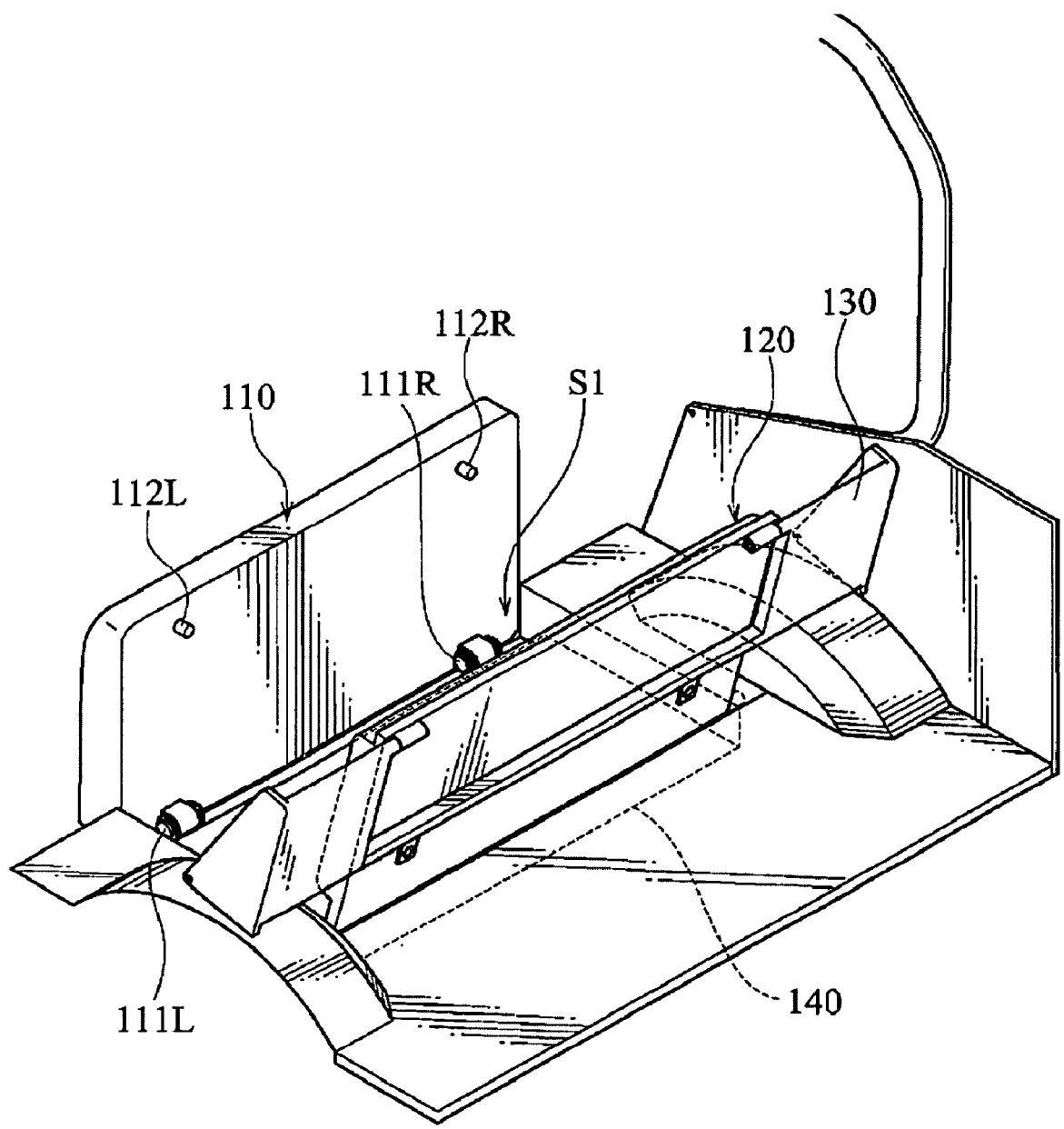
FIG. 3 is a perspective view of a part of the all-terrain vehicle 10 according to the embodiment of the invention with the seating surface 110 rotated forward.

As shown in FIGS. 2 and 3, the rear seat 100 has a seating surface 110, a backrest 120, and a partition plate 130.

The seating surface 110 is formed by an elastic member and designed to support occupant's legs. The seating surface 110 is disposed between the tire houses 85L and 85R.

The seating surface 110 has a front end portion 110a supported to be rotatable forward (in the direction shown by the arrow D2 in FIG. 2) with respect to the all-terrain vehicle 10 about rotation axes 111L and 111R. In this embodiment, the rotation axes 111L and 111R form front rotation axes.

As in the case with the seating surface 110, the backrest 120 is formed by an elastic member, and designed to support occupant's back. The backrest 120 is disposed in the vehicle lateral direction (in the direction shown by the arrow D1 in FIG. 2) at the rear of the front end portion 110a of the seating surface 110.

The backrest 120 has a lower end portion 120a supported to be rotatable forward (in the direction shown by the arrow D2 in FIG. 2) with respect to the all-terrain vehicle 10 about rear rotation axes 121L and 121R arranged in the vehicle lateral direction.

The backrest 120 has a flat-shaped back surface portion 123. The back surface portion 123 is provided with upper rotation axes 122L and 122R.

The partition plate 130 is pivotably carried by backrest 120 to define a front wall of the cargo deck 80. The partition plate 130 extends outward from the backrest 120 in the vehicle lateral direction and abuts on the side plate 82L (see FIG. 1) and the side plate 82R of the cargo deck 80. In other words, the partition plate 130 is wider than the backrest 120 to extend to above the tire houses 85L and 85R.

The partition wall 130 is supported rotatably by the backrest 120 through the upper rotation axes 122L and 122R. In other words, the partition plate 130 is supported to be rotatable forward with respect to the all-terrain vehicle 10 about the upper rotation axes 122L and 122R. The upper rotation axes 122L and 122R are located above the rear rotation axes 121L and 121R.

The partition plate 130 has side plate portions 131L and 131R extending in the longitudinal direction of the all-terrain vehicle 10. The side plate portion 131L is provided at the left end of the partition plate 130, while the side plate portion 131R is provided at the right end of the partition plate 130.

The partition plate 130 has engagement portions 132L and 132R for engaging with engagement projecting portions 112L and 112R (not shown in FIG. 2, see FIG. 3) provided on the underside of the seating surface 110.

The cargo deck 80 has the cargo bed floor 81 and side plates 82L and 82R. The cargo deck 80 also has the tire houses 85L and 85R, which are raised upward from the cargo bed floor 81. The tire houses 85L and 85R are formed together with the cargo bed floor 81 into one.

Figure 4:
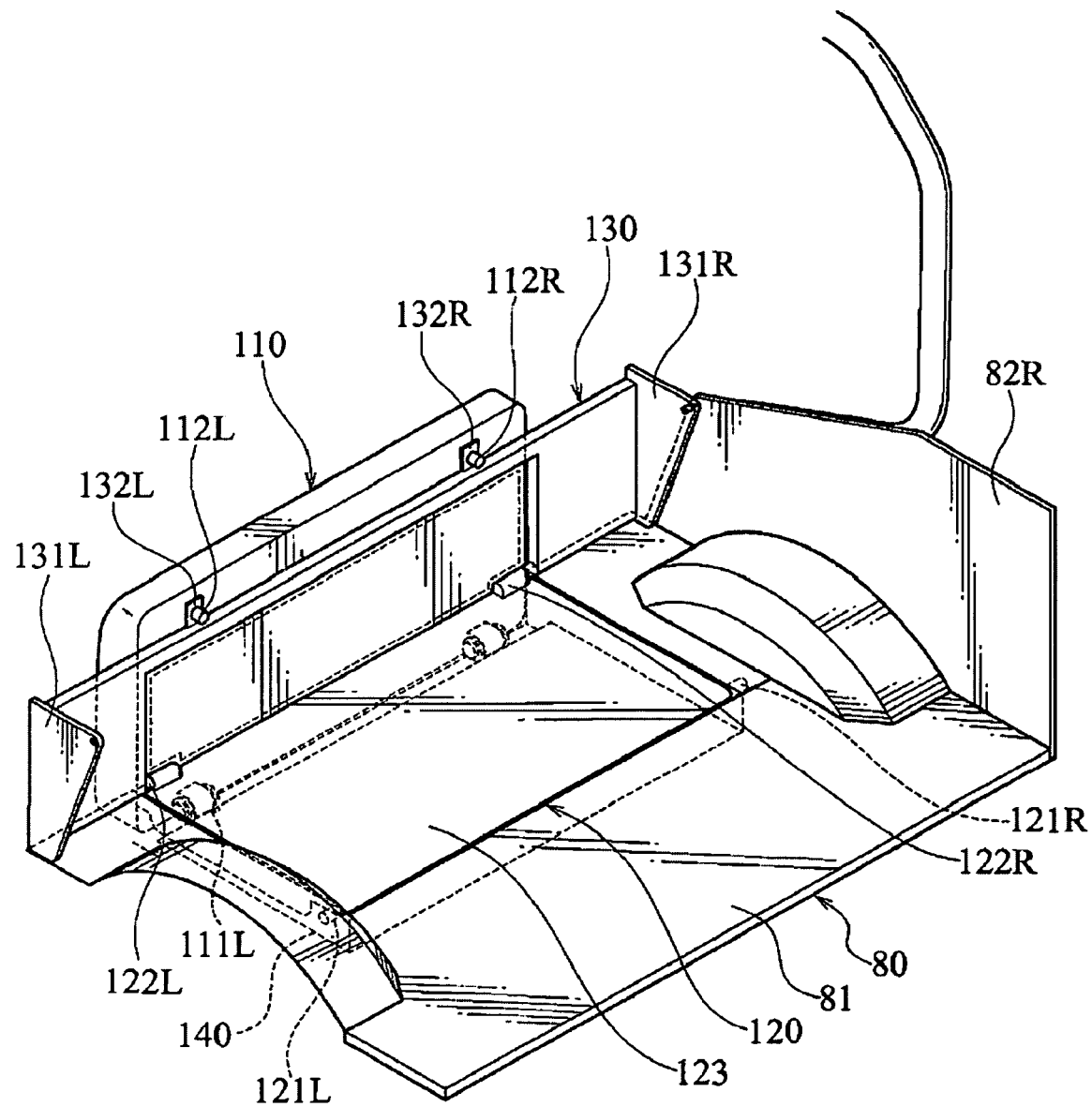
FIG. 4 is a perspective view of a part of the all-terrain vehicle 10 with the backrest 120 rotated forward from the state shown in FIG. 3 to expand a space of the cargo deck 80.

FIG. 3 is a perspective view of a part of the all-terrain vehicle 10 with the seating surface 110 rotated forward. FIG. 4 is a perspective view of a part of the all-terrain vehicle 10 with the backrest 120 rotated forward from the state shown in FIG. 3 to expand the space of the cargo deck 80.

As shown in FIG. 3, when the seating surface 110 is rotated forward with respect to the all-terrain vehicle 10 about the rotation axes 111L and 111R, a recess S1 is exposed for accommodating the backrest 120.

The storage container 140 for storing an article is provided below the recess S1 within article storage area 139. In order to store an article in the storage container 140, the seating surface 110 is rotated forward as shown in FIG. 3 providing access to storage container 140 through recess S1.

FIG. 4 shows the space of the cargo deck 80 which is expanded by rotating the backrest 120 forward from the state shown in FIG. 3. More specifically, rotating the backrest 120 forward about the rear rotation axes 121L and 121R allows the backrest 120 to be accommodated in the recess S1. The rotation axes 111L and 111R are located forward relative to the rear rotation axes 121L and 121R for rotatably supporting the backrest 120.

When the backrest 120 is accommodated in the recess S1, the back surface portion 123 of the backrest 120 and the cargo bed floor 81 of the cargo deck 80 define a continuous plane.

Further, the partition plate 130 is rotated forward about the upper rotation axes 122L and 122R provided on the backrest 120. The partition plate 130 rotated forward is coupled with the seating surface 110 standing upright by an occupant.

More specifically, the engagement protruding portions 112L and 112R provided on the underside of the seating surface 110 engage respectively with the engagement portions 132L and 131R formed on the partition plate 130. More specifically, the engagement protruding portions 112L and 112R are inserted through respective insertion holes (not shown) formed in the engagement portions 132L and 132R. The engagement protruding portions 112L and 112R have respective insertion holes through which engagement pins (not shown) are inserted.

The side plate portion 131R of the partition plate 130 is coupled with the side plate 82R with the backrest 120 rotated forward with respect to the all-terrain vehicle 10. More specifically, an engagement pin (not shown) is inserted through an insertion hole (not shown) formed on the side plate portion 131R and an insertion hole (not shown) formed on the side plate 82R. The side plate portion 131L is coupled with the side plate 82L in the same manner as for the side plate portion 131R.

(2.2) Structure for Storing Storage Container 140

Figure 5:
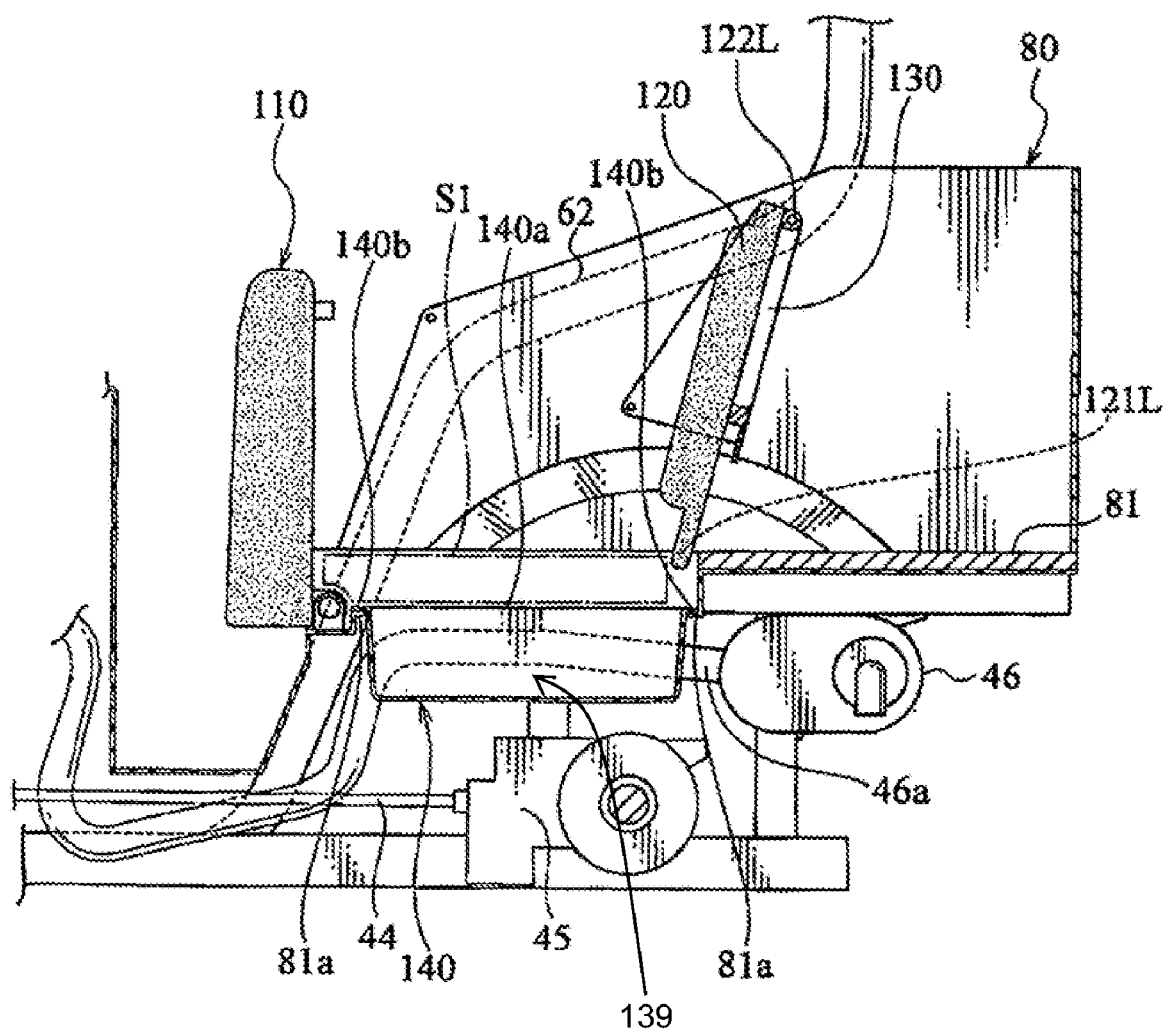
FIG. 5 is a left side elevational view of the all-terrain vehicle 10 according to the embodiment of the invention with the seating surface 110 rotated forward.

FIG. 5 is a left side elevational view of the all-terrain vehicle 10 with the seating surface 110 rotated forward or in the state shown in FIG. 3.

As shown in FIGS. 3 to 5, a storage container 140 is carried within a predefined article storage area 139 below the rear seat 100, or more specifically, the seating surface 110. The storage container 140 preferably has an opening 140a defined within its top for providing access to the interior of the box via the recess of cargo bed floor. The opening portion 140a is open upward with respect to the all-terrain vehicle 10. The storage container 140 is disposed between the left rear wheel 90L and the right rear wheel 90R (see FIG. 2).

When the seating surface 110 is in a first position generally horizontal it covers the opening portion 140a of the storage container 140. More specifically, the seating surface 110 covers the opening portion 140a, while being set to allow an occupant to be seated on the seating surface 110.

As shown in FIG. 4, the backrest 120 is rotated forward from its first generally vertical position about the rear rotation axes 121L and 121R to its second position generally horizontal when the seating surface 110 is rotated forward about the rotation axes 111L and 111R from its first position horizontal to its second position vertical, thereby covering the opening portion 140a.

Above the storage container 140, the recess S1 is created for accommodating the backrest 120 when rotated forward about the rear rotation axes 121L and 121R.

In this embodiment, the storage container 140 may be removable from the all-terrain vehicle 10 by means of solely drawing the storage container 140 out when the seating surface is positioned in its vertical position and the backrest is also maintained in its vertical position thereby exposing recess S1. Preferably a box support portion 81a or frame is formed on the cargo bed floor 81 of the cargo deck 80 and engages with an outer peripheral portion 140b of the storage container 140, thereby supporting the storage container 140. The box support portion 81a is also formed below the seating surface 110.

Removing the storage container 140 from the all-terrain vehicle 10 causes the rear differential case 45 provided below the seating surface 110 and an exhaust pipe 46a connected to the silencer 46 to be exposed. In this embodiment, the rear differential case 45 and the exhaust pipe 46a form a component to be serviced.

(3) Action and Effect

In the all-terrain vehicle 10, the opening portion 140a of the storage container 140 is covered by the seating surface 110 of the folding rear seat 100 or the backrest 120. This protects baggage stored in the storage container 140 from direct water splashes or dust. This also provides more effective theft prevention of baggage compared to the case where the baggage is merely loaded on the cargo deck 80.

In the all-terrain vehicle 10, the opening portion 140a of the storage container 140 is covered by the seating surface 110 or the backrest 120. Further, this minimizes weight increase of the all-terrain vehicle 10, compared to the case where a storage box is provided on the cargo deck 80 or a cover is used for covering the cargo deck 80.

In this embodiment, the storage container 140 is disposed between the left rear wheel 90L and the right rear wheel 90R. This leads to more effective use of a space between the left rear wheel 90L and the right rear wheel 90R.

In this embodiment, the storage container 140 is supported by the box support portion 81a formed on the cargo bed floor 81 of the cargo deck 80. The storage container 140 is removable from the all-terrain vehicle 10 by means of solely drawing the storage container 140 out.

In other words, removing the storage container 140 from the all-terrain vehicle 10 by means of solely drawing the storage container 140 out causes the rear differential case 45 and the exhaust pipe 46a disposed below the storage container 140 to be exposed. This simplifies a process for servicing the rear differential case 45 and the exhaust pipe 46a. In place of the storage container 140, another component (e.g. fuel tank or cooler box) may be installed easily.

In this embodiment, a recess S1 for accommodating the backrest 120 is created at the lower part of the seating surface 110. Further, the backrest 120 has the flat back surface portion 123. Thus, under the condition that the rear seat 100 is folded, the back surface portion 123 of the backrest 120 and the cargo bed floor 81 of the cargo deck 80 defines a continued plane, despite the storage container 140 disposed below the seating surface 110.

(4) Other Embodiments

Heretofore, while the invention has been described based on the embodiment, it should be understood that the description and the drawings forming a part of this disclosure do not limit the scope of this invention. The disclosure may provide the skilled persons in the art with various alternatives.

For example, in the aforementioned embodiment, the back surface portion 123 of the backrest 120 and the cargo bed floor 81 of the cargo deck 80 define a continued plane. However, they do not necessarily define a plane.

In the aforementioned embodiment, the storage container 140 is removable from the all-terrain vehicle 10 by means of solely drawing the storage container 140 out. Alternatively, the storage container 140 may be fixed to the cargo bed floor 81 of the cargo deck 80 with a bolt (not shown) or the like.

In the aforementioned embodiment, the storage container 140 is disposed between the left rear wheel 90L and the right rear wheel 90R. However, the storage container 140 is not necessarily disposed between the left rear wheel 90L and the right rear wheel 90R. For example, the storage container 140 may be disposed in front of a space defined between the left rear wheel 90L and the right rear wheel 90R.

In the aforementioned embodiment, the storage container 140 for storing an article is disposed below the rear seat 100. Alternatively, in place of the storage container 140, a fuel tank may be disposed for reserving fuel to be supplied to the engine 41. For example, a main fuel tank (not shown) may be provided below the front seats 50, while a sub fuel tank (additional tank) may be disposed at the location, where the storage container 140 is disposed, to connect to the main fuel tank.

As thus described, it is a matter of course that the present invention includes various embodiments or the like which are not described herein. Accordingly, the technical scope of the present invention is decided only by the invention specifying items according to the claims that are proper in light of the above descriptions.

What is claimed is:

1. An all-terrain vehicle comprising:
   rear wheels;
   a cargo deck provided above the rear wheels and including a cargo bed floor; and
   a folding rear seat disposed on a front portion of the cargo deck; wherein
   an article storage area is disposed below the rear seat and includes an opening portion in communication with a recess in the cargo bed floor;
   the rear seat includes:
   a seating surface including a front end portion; and
   a backrest disposed in a vehicle lateral direction at a rear of the seating surface; wherein
   the front end portion of the seating surface is supported to be rotatable forward with respect to the all-terrain vehicle about a front rotation axis arranged in the vehicle lateral direction;
   a lower end portion of the backrest is supported to be rotatable forward with respect to the all-terrain vehicle about a rear rotation axis arranged in the vehicle lateral direction;
   the seating surface is arranged to cover the opening portion when moved to allow an occupant to be seated on the seating surface; and
   the backrest is arranged to be rotated forward about the rear rotation axis to cover the opening portion when the seating surface is rotated forward about the front rotation axis.
   the recess is arranged above the article storage area and extending below the cargo bed floor;
   the backrest is arranged to be accommodated within the recess when the backrest is rotated forward; and
   the backrest includes a flat back surface portion that is substantially flush with the cargo bed floor when the backrest is rotated forward.

2. The all-terrain vehicle according to claim 1, wherein the rear wheels include a left rear wheel and a right rear wheel disposed in the vehicle lateral direction; and
   the article storage area is disposed between the left rear wheel and the right rear wheel.

3. The all-terrain vehicle according to claim 1, further comprising:
   a container arranged to be carried within said article storage area; and
   a support portion provided below the seating surface and engaged with the container to support the container; wherein
   the container is arranged to be removed from the all-terrain vehicle solely by pulling the container out of said article storage area.

4. The all-terrain vehicle according to claim 3, wherein a component to be serviced is disposed below the article storage area.

5. An all-terrain vehicle having a profile comprising:
   rear wheels;
   a cargo deck provided above said rear wheels;
   said cargo deck including a cargo bed floor and a recess in the cargo bed floor;
   a container disposed beneath and in communication with said recess;
   said container being carried within the profile of said all terrain vehicle beneath said cargo bed floor; and
   a cover carried by said cargo deck transversing said recess restricting visual perception of said container when said container is disposed beneath said recess.

6. The all terrain vehicle of claim 5, further comprising a container retainer disposed beneath said cargo deck arranged to retain said container with the profile of said all terrain vehicle when positioned beneath said cargo bed floor.

7. The all terrain vehicle of claim 6, wherein said container retainer includes a frame arranged to engage said container enabling said container to be removed via said recess.

8. The all terrain vehicle of claim 7, wherein said frame defines a cavity enabling access from said recess via said cavity to the rear differential case of said all terrain vehicle.

9. The all terrain vehicle of claim 5, further comprising a seat arranged to be moved to a first substantially horizontal position which covers said recess and to a second substantially vertical position exposing said recess.

10. The all terrain vehicle of claim 9, further comprising a back rest arranged to be moved to a first substantially vertical position and to a second substantially horizontal position when said seat is in said second substantially vertical position to cover said recess.

* * * * *